N. F. SANDELIN.
Improvement in Cultivators.

No. 124,014.

Patented Feb. 27, 1872.

Witnesses:
A. W. Almqvist
Wm. H. C. Smith

Inventor:
N. F. Sandelin
per
Attorneys.

UNITED STATES PATENT OFFICE.

NILS F. SANDELIN, OF NEW YORK, N. Y.

IMPROVEMENT IN CULTIVATORS.

Specification forming part of Letters Patent No. 124,014, dated February 27, 1872; antedated February 10, 1872.

*To all whom it may concern:*

Be it known that I, NILS F. SANDELIN, of New York city, in the county and State of New York, have invented a new and useful Improvement in Gang-Plow for Preparing Land for Cotton; and I do hereby declare that the following is a full, clear, and exact description thereof, which will enable others skilled in the art to make and use the same, reference being had to the accompanying drawing forming a part of this specification, in which—

Figure 1:
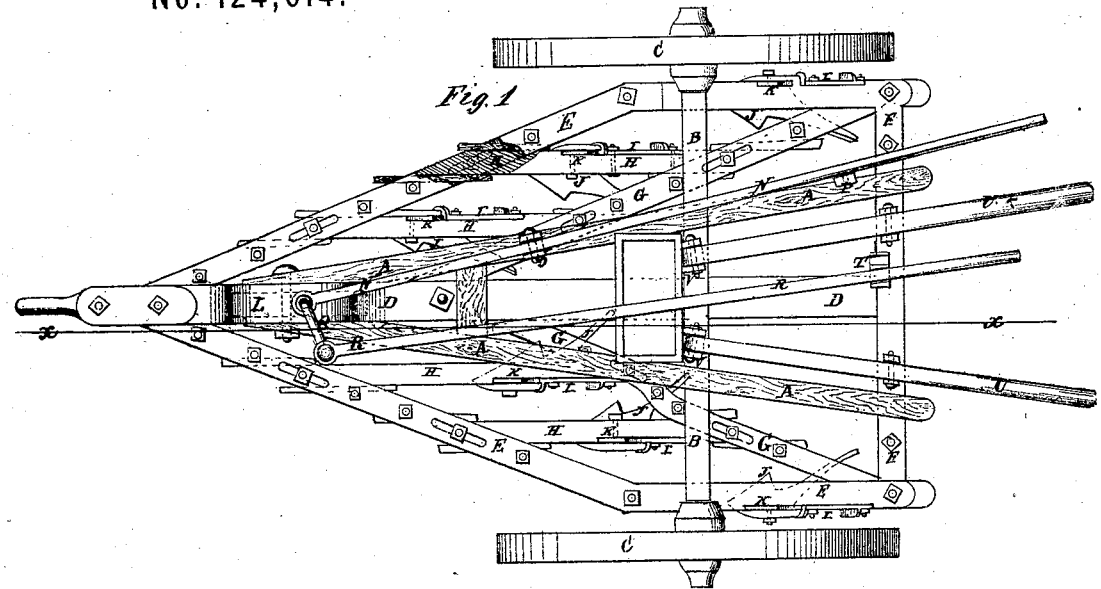
Figure 2:
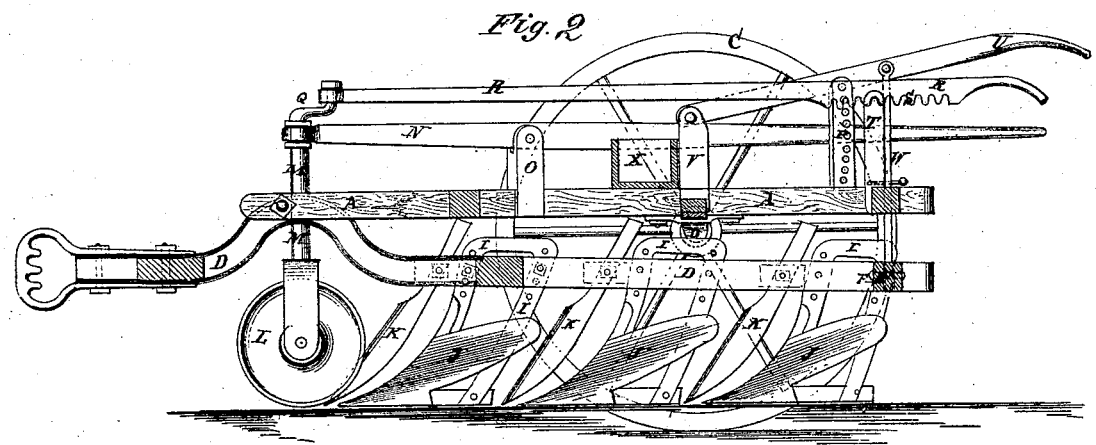
Figure 3:
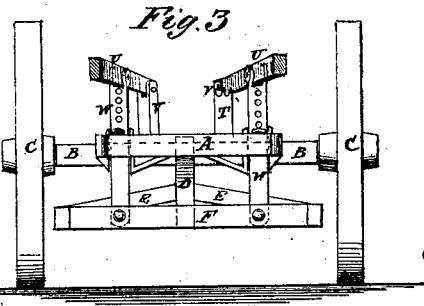

Figure 1 is a top view of my improved machine. Fig. 2 is a detail longitudinal section of the same taken through the line $x\ x$, Fig. 1. Fig. 3 is a rear-end view of the same.

My invention has for its object improvement in gang-plows for cultivating cotton-land, whereby they may be guided in a convenient and perfect manner; and the invention consists in the arrangement of certain parts, as hereinafter described, in connection with others necessary to form a complete or operative machine.

A is the stationary or main frame, triangular in form and secured to the axle B, on which the wheels C revolve. E F G indicate the plow-frame, and D its central beam, which is pivoted at its bow or bend, between the front ends of the side bars of the main frame, and carries a clevis, as shown. H H are short, adjustable, longitudinally-arranged beams of the plow-frame, to which the plows J are attached by double perforated standards I and suitable clamping-bolts. The beams H have tenons on their ends, which enter mortises or slots in the inclined beams E G. By shifting-wedges, which are driven in said slots, and by bolts passing through the tenons, the beams H and plows I J may be adjusted laterally. K are the cutters, the shanks of which are secured to the beams H by bolts and keepers, as shown. The forward end of the plow-frame is supported by the gauge-wheel L, the shank or spindle M of which is made round and passes up through a hole in the bend or bow of the central beam D, and with its upper end is connected the forward end of the lever N, which is pivoted to a stud, O, attached to the frame A, and its rear end extends back into such a position that it may be conveniently reached and operated by the plowman, to raise and lower the wheel L, to regulate the depth at which the plows work in the ground, or to raise the forward end of the plow-frame away from the ground, as may be required. The rear part of the lever N works along the side of a stud, P, attached to the rear part of the frame A, and has a pin attached to it to enter one or the other of the holes in the said stud P, to secure the wheel L in any position into which it may be adjusted. To the upper end of shank M is attached, or upon it is formed, a crank, Q, to the crank-pin of which is pivoted the forward end of the rod or bar R, which extends back into such a position that its rear end may be conveniently reached and operated to turn the wheel L in one or the other direction, to guide the machine, as required. Upon the under side of the rear part of the rod or bar R are formed teeth or notches S. T is a stud, the lower end of which is attached to the rear cross-bar of the frame A. The upper end of the stud T has two notches formed in it of such a width as to receive the rod or bar R. One of the said notches is made with a smooth bottom and is designed to serve as a rest or slide to the rod or bar R while being operated. The other of the said notches is made with a tongue or tooth in its bottom, to take hold of the teeth S of the bar or rod R, to hold the wheel L securely in any position into which it may be adjusted. U U are levers having their fulcrums in studs V and pivoted to the bars W, which pass through slots in the rear cross-bar of the frame A. These bars W connect with the plow-frame, and are provided with holes to permit the insertion of pins for preventing the plow-frame from dropping down too far. X is a box for carrying wrenches and other tools.

What I claim as new, and desire to secure by Letters Patent, is—

The arrangement of the wheel L, spindle M, crank Q, lever N, toothed bar R S, and notched stud T, in connection with the frame A, as shown and described.

The above specification of my invention signed by me this 5th day of April, 1871.

NILS F. SANDELIN.

Witnesses:
 JAMES T. GRAHAM,
 T. B. MOSHER.